May 4, 1965     A. L. FREEDY ETAL     3,181,430
RELIEF VALVE FOR BUCKET LOADER CIRCUITS
Filed July 30, 1962     2 Sheets-Sheet 1

Fig. 1.

INVENTORS
ALLAN L. FREEDY
BY EUGENE J. WITTRY
ATTORNEYS

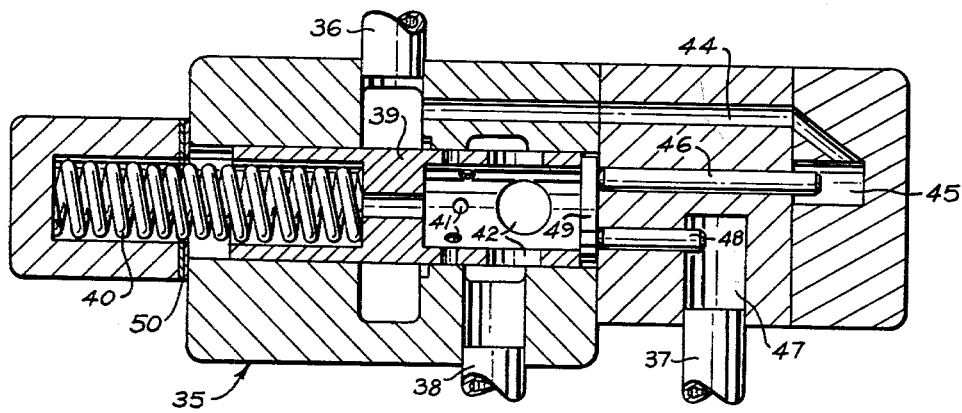
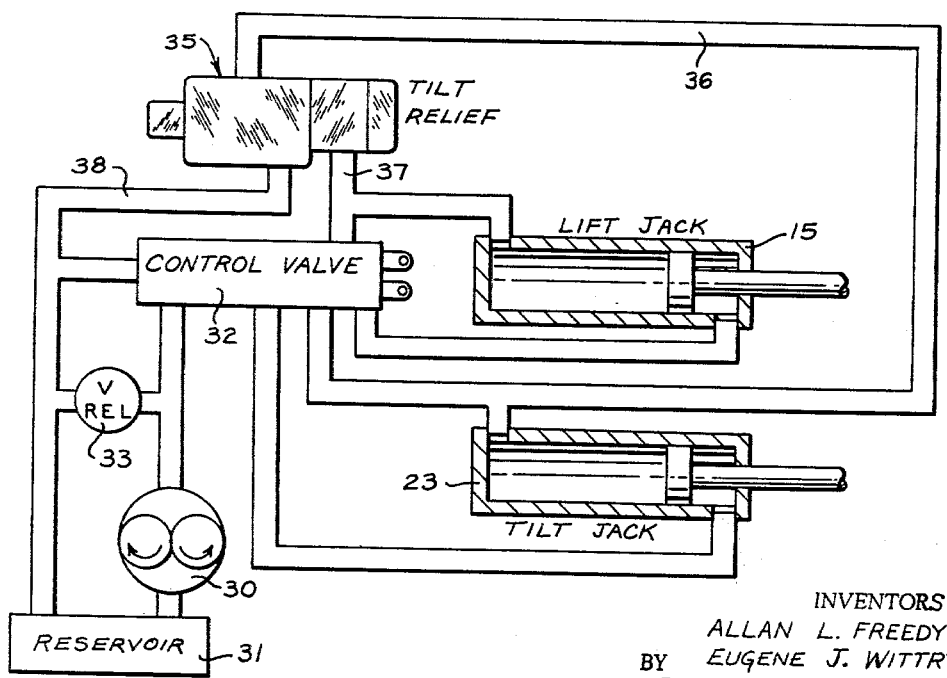
INVENTORS
ALLAN L. FREEDY
EUGENE J. WITTRY
BY Fryer and Grinwold
ATTORNEYS United States Patent Office 3,181,430
Patented May 4, 1965

3,181,430
RELIEF VALVE FOR BUCKET LOADER CIRCUITS
Allan L. Freedy, Aurora, and Eugene J. Wittry, Peoria, Ill., assignors to Caterpillar Tractor Co., Peoria, Ill., a corporation of California
Filed July 30, 1962, Ser. No. 213,347
5 Claims. (Cl. 91—413)

This invention relates to relief valves for bucket loader circuits and particularly to a relief valve and system including the same adapted to function under certain operating conditions in which relief of fluid operating pressure is desirable at a value below the pressure which normally actuates one relief valve in the system.

Many types of vehicle mounted bucket loaders comprise a bucket pivoted to the end of lift arms which swing upwardly from a tractor under influence of hydraulic jacks. Tilt linkage also connected to the bucket is actuated by hydraulic jacks to vary the position of the bucket with respect to the lift arms so that it may be moved between various operating positions such as load, carry and dump positions in a well known manner.

In some desirable arrangements of lift arm and tilt linkages, interferences between mechanical parts occur which cause a fluid lock in the actuating circuit and make certain movements of the bucket impossible without exceeding maximum fluid pressure established by a main relief valve. An example of such a fluid lock occurs in a well known type of linkage when a bucket in a raised position is adjusted to dump position to discharge its contents into a truck and has its forward edge below the edge of the truck body. The accepted way of clearing or removing a bucket from within the truck is to elevate the lift arms to raise the bucket. The tilt linkage of the bucket is resting against a fixed stop on the lift arms at dump position and resists elevation of the lift arms. Attempted elevation of the lift arms therefore causes a fluid lock and increased pressure which is eventually relieved in the lift circuit by the main relief valve.

It is the object of the present invention to overcome the above recited disadvantages in the fluid circuit of a bucket loader or the like and more specifically to provide relief valve means in the tilt circuit of a bucket to function in response to pressures in the lift and tilt circuits without interfering in any way with the proper functioning of the main relief valve or tilt relief valve in conditions other than the above recited fluid lock.

Further and more specific objects and advantages of the invention are made apparent in the following specification wherein reference is made to the accompanying drawings illustrating a preferred form of the invention.

In the drawings:

FIG. 1 is a view in side elevation of the forward portion of a tractor with a bucket shown in broken lines in its load position and in full lines in its dump position;

FIG. 2 is a schematic sectional view of the relief valve which forms a part of the present invention; and FIG. 3 is a schematic diagram of the fluid circuit which includes the lift and tilt jacks of a loader and the relief valve of FIG. 2.

Referring to FIG. 1 of the drawings, a tractor 10 is shown as carrying a bucket 11 at the forward end of a pair of lift arms, one of which is shown at 12. The bucket is pivoted to the arms at 13 and the lift arms 12 are pivoted to the tractor at 14 and a pair of double acting hydraulic jacks, one of which is shown at 15 pivoted to the tractor as at 16, are operable to raise and lower the lift arms 12.

Tilting of the bucket about its pivotal connection 13 with the lift arms is accomplished by tilt linkage which includes two levers 18 and 19 pivoted to the lift arms as at 20 and 21, respectively, and connected together by a double acting hydraulic tilt jack 23. The tilt linkage also includes a link 24 connecting the lever 19 with the bucket and a link 25 connecting the lever 18 with the tractor. Thus extension of the jack 23 tilts the bucket forwardly as to the position shown in full lines in FIG. 1 and retraction of the jack 23 tilts it rearwardly to the position shown in broken lines or further to a carry position. The tilt linkage is of the modified parallelogram type which is used for the purpose of tilting the bucket and is so designed that raising and lowering of the lift arms 12 effects automatic adjustment of the bucket for the purpose of maintaining it in a level or load carrying position during raising of the arms. Since this is a well known arrangement and does not form a part of the present invention, no further description thereof will be necessary herein.

One of the difficulties encountered during the operation of the lift and tilt mechanism disclosed in FIG. 1 is that the bucket is stopped in its dump position by engagement of one or both of the tilt levers 19 with a stop 27 on the lift arm 12. If the contents of the bucket, as is often the case, are dumped into a truck or bin the side wall of which occupies the position indicated in dotted lines at 28 it is customary to raise the lift arms 12 until the bucket clears the wall of the truck or bin before backing away and returning to the position where loading of the bucket takes place. Clearing the wall by tilting the bucket upwardly is not good practice because when the truck or bin is partially filled, such tilting often results in the bucket picking up some of the material that was intended to be dumped. Raising of the lift arms from the position shown in full lines in FIG. 1 has heretofore been impossible because their upward movement places tension on the link 25 tending to rotate the lever 18 in a clockwise direction which would have the effect of retracting the tilt jack 23 by moving the cylinder along the rod and thus tending to compress the relatively noncompressible fluid in the head end of the jack. Thus, an attempt to raise lift arms 12 requires sufficient pressure in the head end of lift jack 15 not only to raise the weight of the linkage, but also to increase the pressure in the head end of tilt jack 23. This results in high pressure in the head end of the lift jack 15 which effects opening of the main relief valve and causes the aforementioned lock.

The foregoing may be more readily understood from an examination of FIG. 3 wherein the hydraulic circuit is schematically shown as including a single lift jack 15 and a single tilt jack 23. A pump 30 withdraws hydraulic fluid from a reservoir 31, and through suitable conduits and a conventional control valve 32, fluid is directed selectively to the opposite ends of the lift and tilt jacks. If neither jack reaches the full extent of its movement or is otherwise stopped with the control valve open and directing pressure thereto excessive pressure is sensed and returned to the reservoir through a main relief valve shown at 33. Consequently, with fluid blocked in the head end of the tilt jack and the pump delivering pressure to the head end of the lift jack with the parts in the immovable position illustrated in FIG. 1, pressure will build up to the extent that the main relief valve opens and no further pressure will be transmitted to the lift jack.

To avoid the above described fluid lock, the present invention provides a special tilt relief valve shown at 35 and illustrated in detail in FIG. 2. This valve is connected with the head end of the tilt jack by means of a line 36, with the head end of the lift jack by a line 37 and with the reservoir by a line 38. A cylindrical valve element or spool 39 is normally held by a spring 40 in a position preventing communication between the tilt jack line 36 and the sump line 38. Movement of the spool 39 toward the left provides such communication through a plurality of small ports 41 communicating with a hollow end of the spool which will receive fluid from the incoming line 36 and direct it to the sump line 38 through a plurality of ports 42. Pressure for overcoming the force of the spring 40 and opening the tilt relief valve comes from the head ends of both the lift and tilt jacks. The tilt jack pressure is communicated from the line 36 through passages 44 to a chamber 45 where it is imposed upon the end of a piston 46. Pressure from the lift jack is communicated from the line 37 to a chamber 47 where it is imposed upon the end of a piston 48. The pistons 46 and 48 bear against a common pressure plate 49 at the end of the spool 39. The force of the spring 40, which may be made adjustable as by the use of shims shown at 50, and the cross sectional dimensions of the pistons 46 and 48 are such that a predetermined pressure in the head end of tilt jack 23 will open relief valve 35 when there is no pressure in the head end of lift jack 15. Under this circumstance, relief valve 35 functions as a normal relief valve. But, when a fully dumped bucket is being raised, the pressure in the head end of lift jack 15 assists in opening relief valve 35. Under this latter condition tilt jack 23 needs less than the predetermined pressure in the head end to open relief valve 35 and lift jack 15 needs less pressure than that needed to open main relief valve 33.

We claim:

1. In a hydraulic circuit including a source of fluid under pressure and two hydraulic jacks to be actuated by said fluid, a normally closed relief valve to relieve fluid from one jack, means to communicate pressure from said one jack to said relief valve to tend to open it, and separate means to communicate pressure from the other of said jacks to tend to open the relief valve.

2. The circuit of claim 1 in which there is a main relief valve between said source and said jacks capable of opening under pressure from any of the jacks.

3. A relief valve for a fluid circuit, there being two hydraulic jacks in said same circuit, said relief valve comprising a spring closed valve element, two pistons slidable toward and engageable with said valve element to open it, and separate means communicating between each of said jacks and one of said pistons whereby pressure in both jacks will effect opening of said relief valve.

4. The combination of claim 3 including a reservoir for fluid, a passage between only one of said jacks and said reservoir, and said relief valve controlling flow through said passage to relieve pressure from said one jack only.

5. In a hydraulic circuit for a bucket loader the combination comprising a source of hydraulic pressure fluid, control valve means receiving fluid from said source, a first hydraulic jack in communication with said control valve means and receiving actuating fluid therefrom, a second hydraulic jack in communication with said control valve means and receiving actuating fluid therefrom, a first normally closed relief valve, first means communicating the head end of said first jack with said relief valve, second means communicating the head end of said second jack with said relief valve, said relief valve responsive to a set pressure to relieve fluid from said first jack, and a second normally closed relief valve hydraulically disposed between said source and said control valve means and responsive to a set pressure to prevent further build up of pressure in said control valve means.

References Cited by the Examiner
UNITED STATES PATENTS

| | | | |
|---|---|---|---|
| 2,653,543 | 9/53 | Mott | 103—5 |
| 2,774,414 | 12/56 | Machlanski | 137—494 |
| 2,811,958 | 11/57 | Raush | 251—62 |
| 2,818,711 | 1/58 | Lincoln et al. | 60—52 |
| 2,831,466 | 4/58 | Strueland | 91—414 |
| 2,890,683 | 6/59 | Pilch | 91—447 |
| 2,928,423 | 3/60 | Rockwell | 91—468 |
| 2,980,135 | 4/61 | Tennis | 91—436 |

FRED E. ENGELTHALER, Primary Examiner.

SAMUEL LEVINE, Examiner.